United States Patent
Matsuda et al.

(10) Patent No.: US 8,672,553 B2
(45) Date of Patent: Mar. 18, 2014

(54) LOAD DETECTING DEVICE FOR ROLLER BEARING AND ROLLER BEARING APPARATUS

(75) Inventors: Shinya Matsuda, Kashiba (JP); Takeshi Teramoto, Yamatokoriyama (JP)

(73) Assignee: JTEKT Corporation, Osaka-shi (JP)

( * ) Notice: Subject to any disclaimer, the term of this patent is extended or adjusted under 35 U.S.C. 154(b) by 351 days.

(21) Appl. No.: 13/008,228

(22) Filed: Jan. 18, 2011

(65) Prior Publication Data

US 2011/0182536 A1 Jul. 28, 2011

(30) Foreign Application Priority Data

Jan. 25, 2010 (JP) ................................. 2010-013215

(51) Int. Cl.
*F16C 19/36* (2006.01)
*F16C 19/52* (2006.01)
(52) U.S. Cl.
USPC ........................................................ 384/448
(58) Field of Classification Search
USPC .................. 384/448; 73/322, 862.49, 862.54, 73/862.627; 340/682
IPC ........................................................ F16C 19/52
See application file for complete search history.

(56) References Cited

U.S. PATENT DOCUMENTS

| | | | |
|---|---|---|---|
| 5,503,030 A | 4/1996 | Bankeström | |
| 6,535,135 B1 * | 3/2003 | French et al. | 340/682 |
| 7,249,522 B2 * | 7/2007 | Kirchdoerffer et al. | 73/818 |
| 7,432,821 B1 * | 10/2008 | Mastro et al. | 340/682 |
| 2004/0196027 A1 * | 10/2004 | Iwamoto et al. | 324/207.21 |
| 2007/0014498 A1 * | 1/2007 | Aoki et al. | 384/448 |
| 2007/0266798 A1 * | 11/2007 | Gebhart | 73/862.49 |
| 2008/0118195 A1 * | 5/2008 | Ishikawa et al. | 384/448 |
| 2008/0170817 A1 * | 7/2008 | McDearmon | 384/448 |
| 2008/0199117 A1 * | 8/2008 | Joki | 384/448 |
| 2008/0204704 A1 * | 8/2008 | Rankin et al. | 356/28 |
| 2008/0214344 A1 * | 9/2008 | Lodge et al. | 474/207 |
| 2011/0002572 A1 | 1/2011 | Miyachi et al. | |

FOREIGN PATENT DOCUMENTS

| | | |
|---|---|---|
| JP | A-7-77218 | 3/1995 |
| JP | A-2002-054914 | 2/2002 |
| JP | A-2008-249014 | 10/2008 |
| JP | A-2009-503484 | 1/2009 |
| WO | WO 2009/113534 A1 | 9/2009 |

OTHER PUBLICATIONS

Oct. 1, 2013 Office Action issued in Japanese Patent Application No. 2010-013215 (with translation).

* cited by examiner

*Primary Examiner* — James Pilkington
*Assistant Examiner* — Richard Urbanski
(74) *Attorney, Agent, or Firm* — Oliff PLC

(57) ABSTRACT

A load detecting device for a roller bearing includes: a strain gauge that is provided in a roller arranged rollably between a first bearing ring and a second bearing ring and that detects a load applied to the roller; a position detecting sensor that detects a rotation position of the roller in a revolution direction of the roller; and a data logger that is provided for the roller and that records and stores a detection signal from the stain gauge.

4 Claims, 6 Drawing Sheets

LOAD DETECTING DEVICE FOR ROLLER BEARING AND ROLLER BEARING APPARATUS

INCORPORATION BY REFERENCE

The disclosure of Japanese Patent Application No. 2010-013215 filed on Jan. 25, 2010, including the specification, drawings and abstract, is incorporated herein by reference in its entirety.

BACKGROUND OF THE INVENTION

1. Field of the Invention

The invention relates to a load detecting device for a roller bearing that is used to support, for example, a main shaft of a wind power generator, and a roller bearing apparatus.

2. Description of the Related Art

Wind, power generation becomes a focus of attention anew in recent years as an eco-friendly way to generate electric power without emitting carbon dioxide. Wind power generation has been rapidly becoming widespread in the world, while upsizing of a wind power generator has been proceeding in order to obtain a larger amount of generated power. In addition, in order to suppress an increase in the weight of a generator resulting from such upsizing, various structure improvements, such as employment of a thin-walled generator frame and a thin-walled journal box, for weight reduction have also been carried out. On the other hand, a load applied to a bearing that supports a main shaft of a rotor has been increasing due to the upsizing of the generator, and, in addition, a distribution of load applied to a bearing, particularly, rolling elements, has become complex due to improvement in the structure of the journal box, or the like. Therefore, it is especially important to accurately analyze the durability and service life of the bearing. Accordingly, there is a need for a measuring method by which a load applied to the rolling elements of the bearing is more accurately obtained.

In an existing art, in order to measure a load applied to a bearing, a strain gauge is provided inside a rolling element of the bearing as described in Japanese Patent Application Publication No. 7-77218 (W-A-7-77218). Specifically, in the technique described in JP-A-7-77218, a hole is formed along the axis of a roller, a strain gauge is provided on an inner surface of the hole, and the strain gauge is connected to a transmitting coil provided integrally with the roller. In addition, an annular receiving coil is provided on a side surface of an outer ring, and an output signal from the strain gauge, transmitted from the transmitting coil in real time, is received by the receiving coil. Then, the receiving coil is connected to an external computer, and received data are processed by the computer.

SUMMARY OF INVENTION

It is an object of the invention to provide a load detecting device for a roller bearing and a roller bearing apparatus that are able to acquire a highly accurate load detection signal with less influence of noise to use the acquired load detection signal for load analysis.

An aspect of the invention relates to a load detecting device for a roller bearing. The load detecting device includes a load detecting sensor, a position detecting sensor, and a recording device. The load detecting sensor is provided in a roller arranged rollably between a first bearing ring and a second bearing ring, and detects a load applied to the roller. The position detecting sensor detects a rotation position of the roller in the revolution direction of the roller. The recording device is provided for the roller, and records and stores a detection signal from the load detecting sensor.

BRIEF DESCRIPTION OF DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
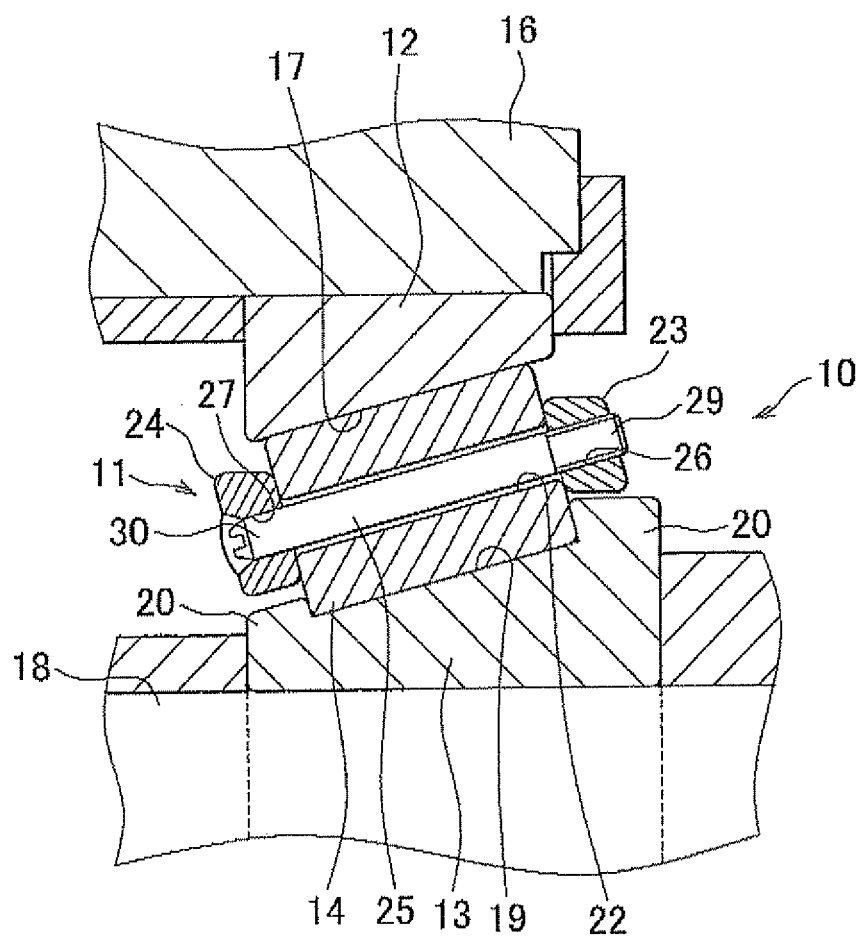
FIG. 1 is a side sectional view of a roller bearing to which a load detecting device according to a first embodiment of the invention is applied.

An embodiment of the invention will be described with reference to the accompanying drawings. FIG. 1 is a side sectional view of a tapered roller bearing 10 to which a load detecting device according to an embodiment of the invention is applied. The tapered roller bearing 10 according to the embodiment includes a pin-type retainer 11. The tapered roller bearing 10 includes an outer ring (a first bearing ring) 12, an inner ring (a second bearing ring) 13, a plurality of tapered rollers 14 and the pin-type retainer 11.

The outer peripheral side of the outer ring 12 is fixed to a housing 16. The outer ring 12 has an outer ring raceway surface 17 on its inner peripheral side. The outer ring raceway surface 17 is inclined with respect to the axial direction of the outer ring 12. In addition, the outer ring 12 is formed to have a trapezoidal sectional shape, that is, one axial end portion is formed so as to be thicker than the other axial end portion in the radial direction. In addition, a rotary shaft 18 is fitted to the inner peripheral side of the inner ring 13. The inner ring 13 has an inner ring raceway surface 19 on its outer peripheral side. The inner ring raceway surface 19 is inclined with respect to the axial direction of the inner ring 13, and faces the outer ring raceway surface 17. In addition, rib portions 20, which restrict axial movement of the tapered rollers 14, are formed on respective sides of the inner ring raceway surface 19 in the axial direction.

The multiple tapered rollers 14 are held between the outer ring raceway surface 17 and the inner ring raceway surface 19 by the retainer 11, and are arranged at intervals in the circumferential direction. In addition, a through-hole 22 is formed at the center of each tapered roller 14. Each through-hole 22 extends along the central axis of the tapered roller 14, and passes through the tapered roller 14.

The retainer 11 includes an annular first ring 23, an annular second ring 24 and round-bar pins 25. The second ring 24 is provided apart from the first ring 23 in the axial direction. The pins 25 couple the first ring 23 to the second ring 24. Multiple screw holes 26 axe formed in the first ring 23 at intervals in the circumferential direction, and pass through the first ring 23. The second ring 24 has an inside diameter that is smaller than the inside diameter of the first icing 23, and has an outside diameter that is smaller than the outside diameter of the first ring 23. Multiple fitting holes 27 are formed at intervals in the circumferential direction.

One end portion of each pin 25 has an external screw 29, and the other end portion has a press-fitted portion 30. Each pin 25 is fixed to the first and second rings 23 and 24 by screwing the external screw 29 into the screw hole 26 of the first ring 23 and then press-fitting the press-fitted portion 30 into the fitting hole 27 of the second ring 24. In addition, the middle portion of each pin 25 in its longitudinal direction is passed through the through-hole 22 of the tapered roller 14, and rotatably supports the tapered roller 14. Note that each press-fitted portion 30 may be welded to a portion of the second ring 24, which is around the fitting hole 27.

In the thus configured tapered roller bearing 10, the inner ring 13 rotates as the rotary shaft 18 rotates, and then each tapered roller 14 rotates about its axis while revolving around the axis of the tapered roller bearing 10 as the inner ring 13 rotates.

Figure 2A:
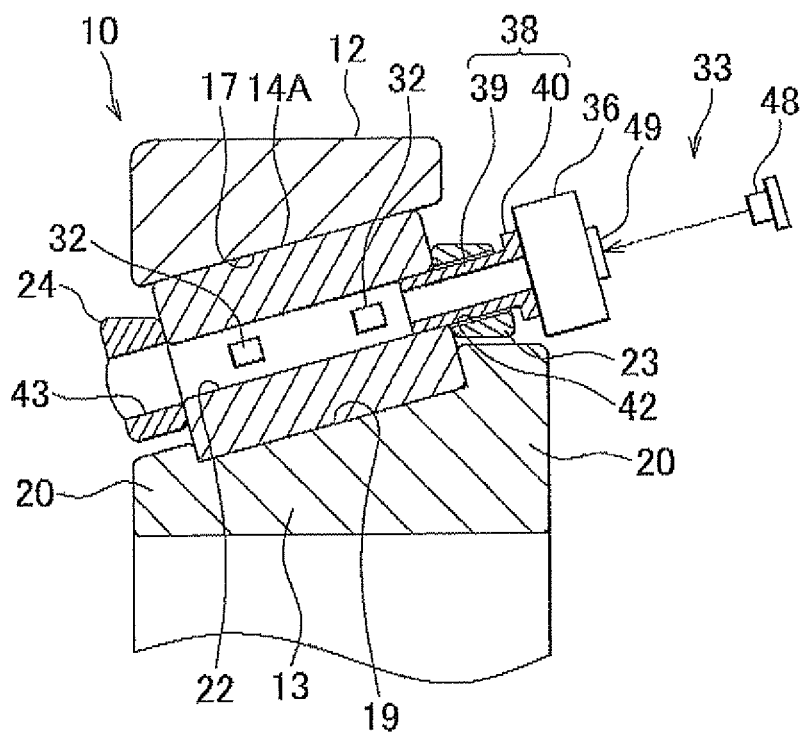
FIG. 2A is a side sectional view of a roller bearing that includes a tapered roller provided with a load detecting sensor and a recording device.

FIG. 2A is a side sectional view of a roller bearing that includes a tapered roller 14A provided with load detecting sensors 32 and a recording device 36. One tapered roller (hereinafter, also referred to as "detection-target roller") 14A of the tapered roller bearing 10 according to the embodiment is provided with the load detecting sensors 32, a position detecting sensor 33 (photoreceiver 49) and the recording device 36. In the embodiment, a so-called strain gauge is used as each of the load detecting sensors 32, and two strain gauges 32 are provided on the inner peripheral surface of the through-hole 22 of the detection-target roller 14A. The strain gauges 32 include an active gauge and a dummy gauge for temperature compensation, which are connected to the recording device.

The two strain gauges 32 are arranged apart from each other in the axial direction of the detection-target roller 14A, and are provided on the inner peripheral surface of the through-hole 22, at the same position in the circumferential direction. Then, the strain gauges 32 detect a strain caused in the detection-target roller 14A as a change in voltage, thereby detecting a load applied to the detection-target roller 14A.

In the embodiment, a data logger is used as the recording device 36. The data logger 36 is an exclusive one that incorporates therein a substrate having a bridge circuit corresponding to outputs of the strain gauges 32. The data logger 36 has a connection terminal to which the strain gauges 32 and the position detecting sensor 33 are connected and a connection terminal to which a communication device used to communicate with a computer 50 is connected. Then, the data logger 36 has, for example, a function of receiving analog signals indicating voltages generated in the strain gauges 32, a function of converting the received analog signals into digital signals, a function of recording and storing data converted to the digital signals in time sequence, and a function of outputting the stored data to an external device, such as a computer.

Note that the recording device 36 may be configured by providing a substrate having a bridge circuit in a commercially available data logger. However, in this case, there is a drawback that the size of the recording device 36 increases. Therefore, when it is difficult to provide the large recording device 36, an exclusive data logger that incorporates therein a substrate having a bridge circuit corresponding to outputs of the strain gauges is manufactured to make it possible to reduce the size of the recording device 36. Thus, the recording device 36 is easily attached to the detection-target roller 14A.

The data logger 36 is attached to an end surface of the detection-target roller 14A via an attachment jig 38. The attachment jig 38 has an engaged portion 39 and a flange portion 40. One end portion of the engaged portion 39 is engaged with the through-hole 22. The flange portion 40 is formed at the other end of the engaged portion 39. The data logger 36 is fitted to the flange portion 40 by a fitting screw, or the like. Therefore, the data logger 36 rotates about its axis and revolves around the axis of the tapered roller bearing 10 together with the detection-target roller 14A.

Figure 4:
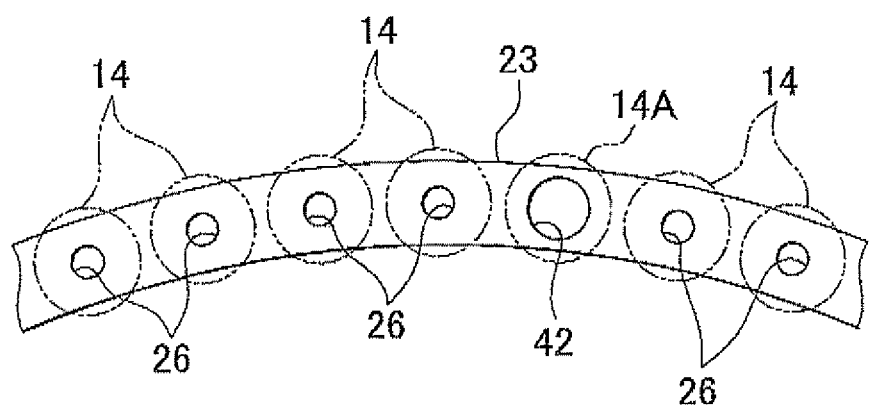
FIG. 4 is a partial front view of a retainer.

FIG. 4 is a partial front view of the retainer (first ring). As shown in FIG. 2A and FIG. 4, the fast ring 23 has the plurality of screw holes 26 formed at intervals in the circumferential direction, and only one through-hole 42 that is larger in diameter than each screw hole 26 is formed. In addition, as shown in FIG. 2A, the second ring 24 has only one through-hole 43 that is larger in diameter than each fitting hole 27. Then, the detection-target roller 14A is arranged at a position corresponding to these through-holes 42 and 43.

Then, the engaged portion 39 of the attachment jig 38 is inserted into the through-hole 42 from an outer side in the axial direction, and is fitted into the through-hole 22 of the detection-target roller 14A. The flange portion 40 and the data logger 36 fitted to the flange portion 40 are arranged at a position that is further outward than the first ring 23 in the axial direction.

Figure 3:
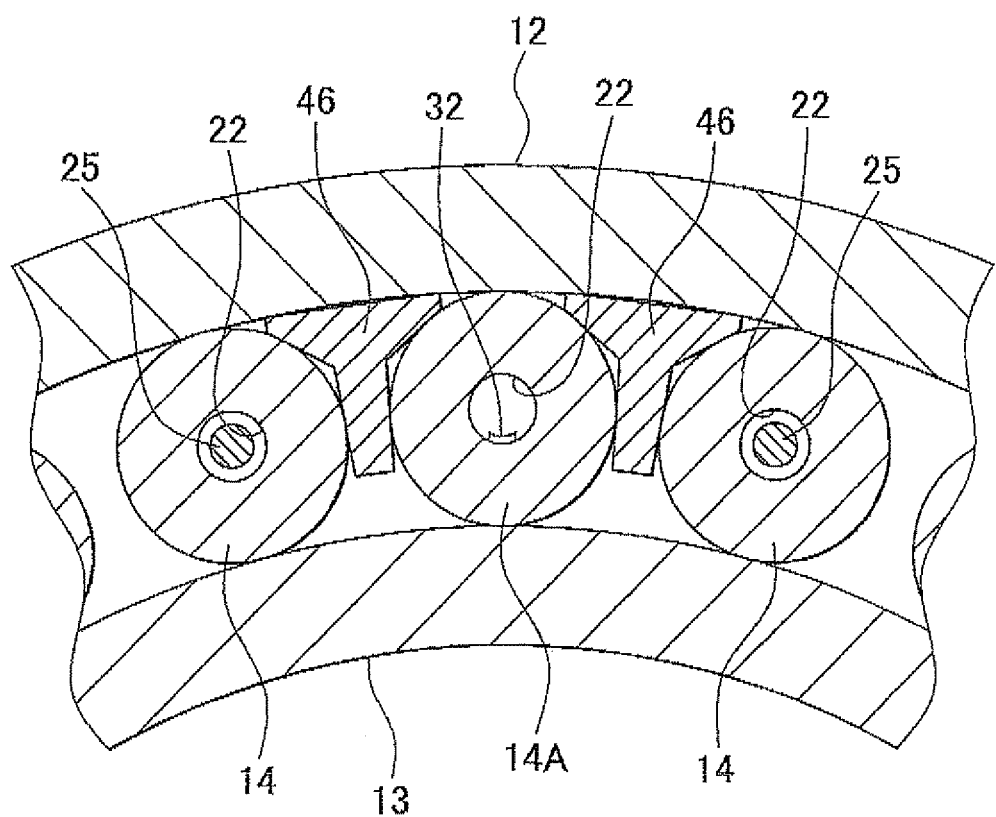
FIG. 3 is a partial front sectional view of a tapered roller bearing.

FIG. 3 is a front sectional view of the tapered roller bearing. Because the strain gauges 32 and the attachment jig 38 are fitted in the through-hole 22 of the detection-target roller 14A, the pin 25 of the retainer 11 is not inserted in the through-hole 22 of the detection-target roller 14A. Therefore, in the embodiment, the position of the detection-target roller 14A in the circumferential direction is maintained by separators 46 shown in FIG. 3. The sectional shape of each separator 46 is a substantially T-shape. The separators 46 are arranged between the detection-target roller 14A and the tapered rollers 14 located on respective sides of the detection-target roller 14A. Each separator 46 contacts the radially intermediate portion and radially outer portion of the corresponding tapered roller 14 and the radially intermediate portion and radially outer portion of the detection-target roller 14A to maintain the distance between the tapered roller 14 and the detection-target roller 14A. In addition, each separator 46 has substantially the same length as the length of the tapered roller 14 in the axial direction, and is held between the first ring 23 and the second ring 24 with gaps.

As shown in FIG. 2A, the position detecting sensor 33 is formed of a phototransmitter 48 and the photoreceiver 49. The phototransmitter 48 emits light, such as laser. The photoreceiver 49, such as a photodiode, receives light emitted from the phototransmitter 48. Then, the photoreceiver 49 is fitted to an end surface of the data logger 36 provided for the detection-target roller 14A, and outputs a detection signal indicating received light to the data logger 36.

The phototransmitter 48 is provided at the housing 16, or the like, that supports the tapered roller bearing 10, and is provided so as to emit light toward one point on a movement path resulting from revolution of the tapered rollers 14 (revolution path). For example, the phototransmitter 48 transmits light toward the uppermost position of the revolution path of the tapered rollers 14, and the photoreceiver 49 receives light from the phototransmitter 48 when the detection-target roller 14A has reached the uppermost position of the revolution path. Then, the detection signal indicating light received by the photoreceiver 49 is recorded in the data logger 36. When recorded, the detection signal indicating light is associated with the detection signal from the strain gauges 32.

Figure 2B:
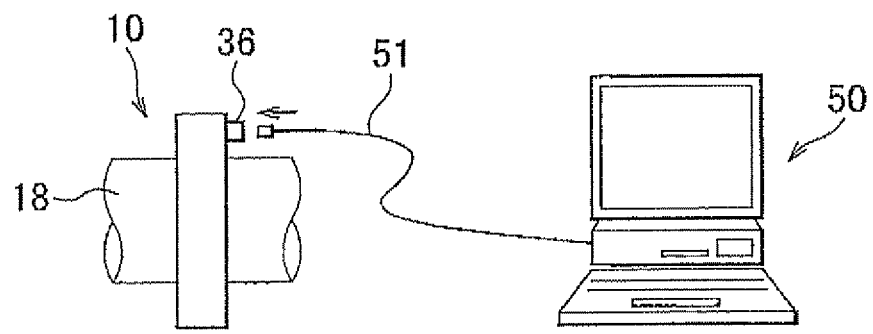
FIG. 2B is a schematic view that shows a configuration in which the recording device is connected to a computer.

In the embodiment, the rotary shaft 18 is operated for a predetermined period of time, and the detection signals from the strain gauges 32 and the detection signals from the position detecting sensor 33 obtained during the predetermined period of time are stored in the data logger 36. Then, after completion of the operation, as shown in FIG. 2B, the connection terminal of the data logger 36 is connected to the computer 50 by a cable 51, or the like, and then the data stored in the data logger 36 are loaded to the computer 50. The computer 50 obtains a load (rolling element load) applied to the detection-target roller 14A based on the detection signals from the strain gauges 32, and then draws a graph in form of the correlation between the rolling element load and the rotational position (revolution angle) of the detection-target roller 14A in the revolution direction.

Figure 5:
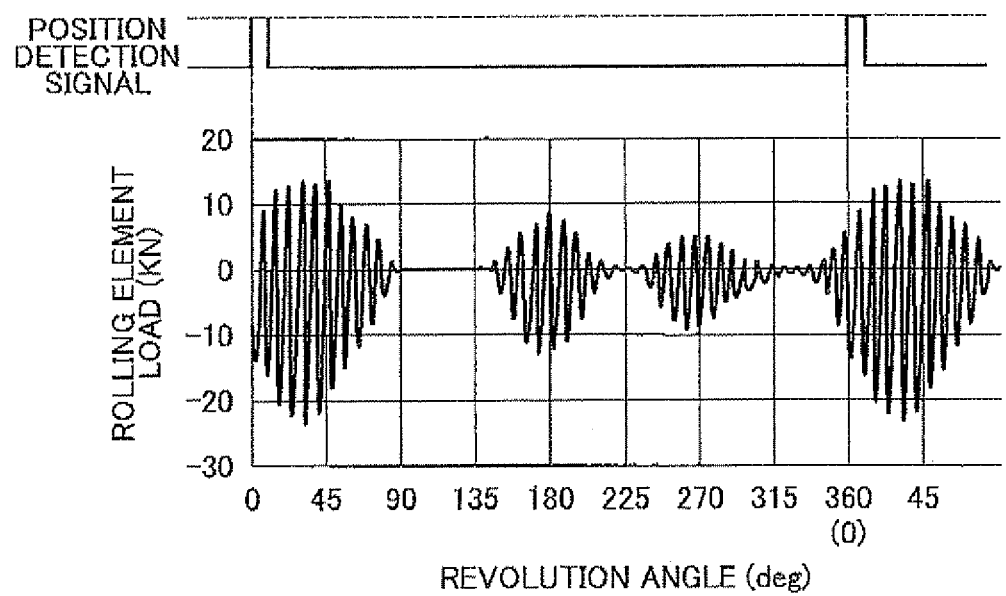
FIG. 5 is a graph that shows the relationship between the revolution angle of a detection-target roller and a load applied to the detection-target roller.

FIG. 5 is a graph that shows the relationship between the revolution angle of the detection-target roller and the load applied to the detection-target roller. The computer 50 records changes of the rolling element load during a predetermined operating period of time, using, for example, a position at which a signal is detected by the position detecting sensor 33 as the position at which the revolution angle is 0°, thereby drawing the waveform shown in FIG. 5. Note that one cycle of the waveform drawn in the graph shown in FIG. 5 corresponds to one rotation of the detection-target roller 14A, and a period from one output to the next output of the position detecting sensor 33 corresponds to one revolution (0° to 360°) of the detection-target roller 14A.

Figure 6:
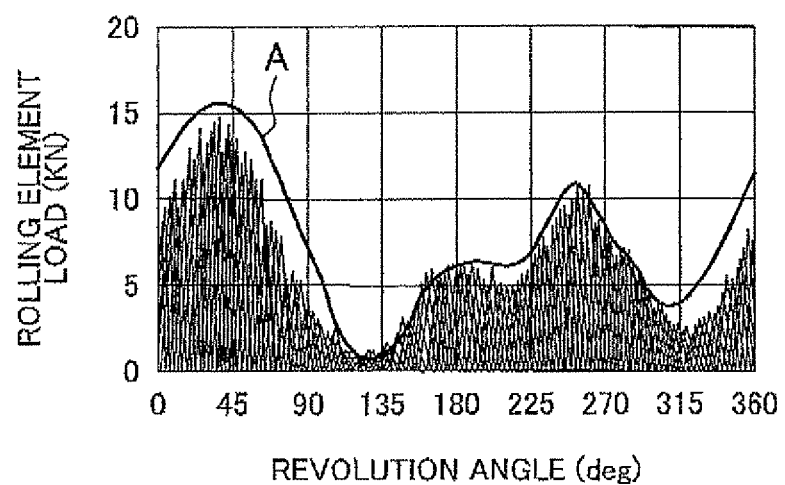
FIG. 6 is a graph that shows a distribution of load applied to the detection-target roller.

Then, the graph of the relationship between the revolution angle and the rolling element load, obtained in FIG. 5, is cut off on a revolution-to-revolution basis, and then the graphs of the respective revolutions are superimposed on top of each other to draw the graph shown in FIG. 6. Then, the envelope of the graph is drawn to acquire a distribution of load applied to the tapered rollers 14 in one revolution. Note that FIG. 6 shows the result acquired by subjecting the rolling element load to FEM analysis using solid line A, as reference. It is found that the distribution of the rolling element load measured by the strain gauges 32 and the distribution of the rolling element load acquired through FEM analysis have substantially the same tendency.

As described in detail above, in the embodiment, the detection signals from the strain gauges 32 are recorded and stored in the data logger 36, and, after a lapse of the predetermined operating period of time, the stored detection signals are loaded to the computer 50 and analyzed. Therefore, in comparison with the existing art (JP-A-7-77218) in which a detection signal is transmitted to the computer 50 in real time, the influence of noise becomes less and it is possible to perform highly reliable load analysis using highly accurate detection signals.

In addition, the detection signal from the position detecting sensor 33 is recorded in the data logger 36. When recorded, the detection signal from the position detecting sensor 33 is associated with the detection signal from the strain gauges 32. Therefore, it is possible to accurately analyze a distribution of load applied to the rolling elements in the revolution direction based on the revolution angle of the detection-target roller 14A and the rolling element load at that angle.

The position detecting sensor 33 is formed of the phototransmitter 48 that emits light toward the revolution path of the detection-target roller 14A and the photoreceiver 49 that is provided for the detection-target roller 14A. Because the detection signals indicating light received by the photoreceiver 49 are recorded in the data logger 36, the detection signals from the photoreceiver 49 are easily associated with the detection signals from the strain gauges 32.

In the embodiment, the tapered roller bearing 10 including the pin-type retainer 11 is used as a detection-target bearing. Therefore, the strain gauges 32 and the data logger 36 are mounted by using the through-hole 22 formed in the tapered roller 14 in advance. It is not necessary to machine an additional hole in the tapered roller 14.

The invention is not limited to the embodiment described above, and design changes may be made as needed. For example, the invention is not limited to the tapered roller bearing 10, and may also be applied to a cylindrical roller bearing. In addition, the invention may also be applied to an ordinary roller bearing having no pin-type retainer 11. In this case, a hole that passes through a detection-target roller in the axial direction is formed in the detection-target roller, and the strain gauges 32 and the data logger 36 are fitted in the hole.

In the above embodiment, two strain gauges 32 are provided in the detection-target roller 14A. Alternatively, one strain gauge 32 or three or more strain gauges 32 may be provided in the detection-target roller 14A. In addition, in the above embodiment, a distribution of load applied to the tapered rollers 14 in the revolution direction is obtained based on the detection signals from the strain gauges 32. Alternatively, a distribution of linear pressure applied to the tapered rollers 14 may be obtained based on the outputs of the plurality of strain gauges 32 arranged in the axial direction or a skew angle of the tapered rollers 14 may be obtained based on a phase difference between outputs of the respective strain gauges 32.

In the above embodiment, the data logger 36 is connected to the computer 50 by the cable. Alternatively, the data logger 36 may be connected to the computer 50 wirelessly. In this case, the influence of attenuation or noise due to wireless communication becomes a problem. However, detection signals stored in the data logger 36 are converted to digital data and, in addition, data may be loaded during a stop of operation. Therefore, it is possible to reduce the influence of noise.

In addition, the data logger 36 may be a device that loads data onto a mobile storage medium, such as a flash memory. In this case, the computer 50 does not need to be directly connected to the data logger 36. Therefore, installation of wiring is omitted or the flexibility of installation of the computer 50 is improved.

In the above embodiment, the phototransmitter 48 of the position detecting sensor 33 transmits light toward one point on the revolution path of the tapered rollers 14. Alternatively, the phototransmitter 48 may transmit light toward multiple points (for example, points at which the revolution angles are 0° and 180°) on the revolution path.

In addition, in the above embodiment, the position detecting sensor 33 is formed of the phototransmitter 48 and the photoreceiver 49. Alternatively, the position detecting sensor 33 may be formed of a phototransmitter/photoreceiver and a reflector. In this case, a configuration may be employed in which the reflector is provided at the detection-target roller 14A, the phototransmitter/photoreceiver transmits light and then receives light reflected by the reflector, whereby the rotation position of the detection-target roller 14A in the revolution direction is detected.

In addition, the position detecting sensor 33 may be another type of sensor, for example, an encoder or a resolver. However, if the position detecting sensor 33 formed of the phototransmitter 48 and the photoreceiver 49 is used as in the above embodiment, it possible to provide the low-cost position detecting sensor 33 with a considerably simple configuration.

The data logger 36 may be provided on an opposite end surface of the detection-target roller 14A via the attachment jig 38. The photoreceiver 49 of the position detecting sensor 33 may be fitted to the end surface of the detection-target roller 14A or the retainer 11.

What is claimed is:

1. A load detecting device for a roller bearing, comprising:
a load detecting sensor that is provided in a roller arranged rollably between a first bearing ring and a second bearing ring, and that detects a load applied to the roller;
a position detecting sensor that detects a rotation position of the roller in a revolution direction of the roller; and
a recording device that is provided on the roller, and that records and stores a detection signal from the load detecting sensor; wherein
the position detecting sensor includes a phototransmitter that transmits light toward a predetermined position on a revolution path of the roller, and a photoreceiver that is provided at the roller or a member revolving together with the roller and that receives light transmitted from the phototransmitter; and
the recording device records a detection signal indicating light received by the photoreceiver, the detection signal indicating light being associated with the detection signal from the load detecting sensor.

2. The load detecting device for a roller bearing according to claim 1, wherein the load detecting sensor is provided in a hole formed along an axis of the roller, and the recording device is attached to an axial end surface of the roller via an attachment jig fitted in the hole.

3. A roller bearing apparatus, comprising:
a roller bearing that includes a first bearing ring, a second bearing ring and a roller that is rollably arranged between the first bearing ring and the second bearing ring; and
a load detecting device that includes:
a load detecting sensor that is provided in the roller and that detects a load applied to the roller;
a position detecting sensor that detects a rotation position of the roller in a revolution direction of the roller; and
a recording device that is provided on the roller and that records and stores a detection signal from the load detecting sensor; wherein
the position detecting sensor includes a phototransmitter that transmits light toward a predetermined position on a revolution path of the roller, and a photoreceiver that is provided at the roller or a member revolving together with the roller and that receives light transmitted from the phototransmitter; and
the recording device records a detection signal indicating light received by the photoreceiver, the detection signal indicating light being associated with the detection signal from the load detecting sensor.

4. The roller bearing apparatus according to claim 3, wherein the load detecting sensor is provided in a hole formed along an axis of the roller, and the recording device is attached to an axial end surface of the roller via an attachment jig fitted in the hole.

* * * * *